Dec. 31, 1929.  E. I. McGEE  1,742,043
VALVE
Filed June 24, 1926   2 Sheets-Sheet 1

Inventor
Edgar I. McGee
By Johnson & Johnson
Attorneys

Inventor
Edgar I. M<sup>c</sup>Gee

By Johnson & Johnson

Attorneys

Patented Dec. 31, 1929

1,742,043

UNITED STATES PATENT OFFICE

EDGAR IRICK McGEE, OF SCOTTDALE, PENNSYLVANIA, ASSIGNOR TO BOYTS, PORTER & CO., OF CONNELLSVILLE, PENNSYLVANIA, A CORPORATION OF PENNSYLVANIA

VALVE

Application filed June 24, 1926. Serial No. 118,240.

The invention relates to valves and has as an object the provision of a valve having a direct flow, which may be assembled in a simple manner.

A further object of the invention is the provision of a valve having a lining to protect the valve housing from deleterious action of liquids.

It is a further object of the invention to provide a check valve having a port at right angles to the flow of liquid and at the same time having provision for initial circular motion of the valve with respect to the port.

Further objects of the invention will appear from the following description when read in connection with the acompanying drawings showing an illustrative embodiment of the device, wherein.

Figure 1:
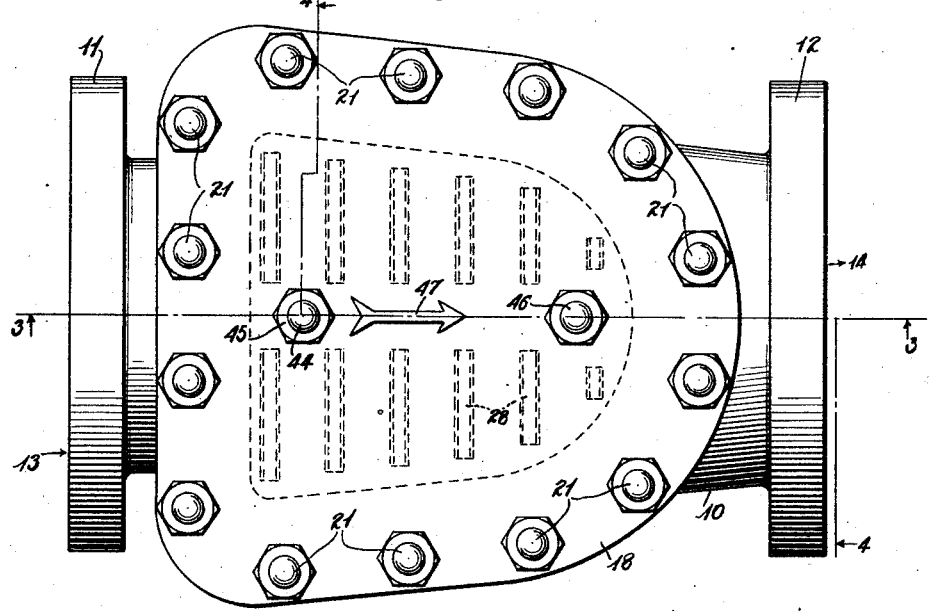
Figure 1 is a plan view.
Figure 2:
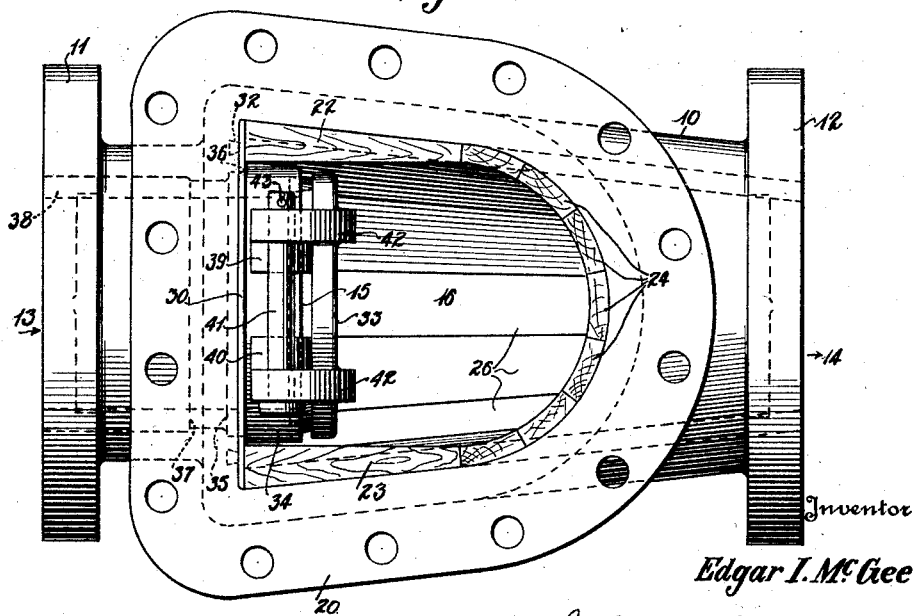
Figure 2 is a like view with the cover removed.

As shown, the device comprises a body 10 having flanges 11, 12, for connection into a pipe line in a well-known manner. The inlet of the valve is shown at 13 and the outlet at 14 and a valve seat is shown at 15.

The valve body is formed with an enlarged recessed portion at 16 from which portion the interior of the valve body tapers to the outlet valve body 14. To give access to the interior of the body, an opening is provided into the enlarged portion 16 at 17 which opening is shown as closed by a cover plate 18, a gasket 19 being provided to preserve a tight joint. To provide for the securing of cover plate 18 to the valve body, the latter is provided with a flange 20 surrounding the opening 17, upon which flange the cover plate may be secured as by means of bolts 21.

The interior of the valve body is desirably lined with non-corroding material, a portion is shown as lined with wood, another portion being lined with such material as lead, and the portions which are not lined in such manner are desirably formed of a non-corroding material such as bronze. For convenience in placing the lining, the inner surfaces of the body are formed in such manner that wood may be applied thereto without bending the wood in a direction transverse to the length of its grain. To this end, the interior of the enlargement 16 of the chamber is shown as formed upon vertical lines whereby thickened slabs of wood as 22, 23 may be used to line the sides of the chamber and vertical, transversely curved strips, straight throughout their length, 24 may be used in the curved front portion of the chamber.

The lower edges of the strips 22, 23, are indicated as thinned away at 25 upon a curve to preserve the contour of the lower portion of the valve chamber. The latter portion of the chamber may be lined with strips 26 which are straight throughout their length, curved transversely, and properly tapered to fit within the space. The portion of the body adjacent the inlet 13 is a simple cylinder to line. The inside of the cover 18 is shown as lined with a non-corroding metal, as lead, at 27. Preferably dovetailed shaped recesses 28 are formed in the material of the cover and the lead lining 27 is applied in a molten condition into a recess 29 in the cover, the molten material flowing into the recess 28 to secure the lining in position. The vertical rear surface of the chamber 16 is shown as lined at 30 with a material of the nature of that used at 27. In this instance also, dovetailed shaped recesses 31, 32 are desirably provided in the casting forming the body of the valve to interlock with the applied lining metal.

To carry the valve seat 15 and the flap valve 33, there is shown a collar 34 which is desirably cast of a non-corroding material such as bronze. Pressure upon this collar in the action of the valve will be toward the inlet 13 and to resist this pressure, the collar 34 is shown as provided with a shoulder 35 seated against a complementary shoulder in the body 10. The second shoulder 36 is shown to overlap the lining 30. The valve body is shown as slightly recessed at 37 so that the lining 38 of the inlet portion of the valve may be thicker than and flush with the interior surface of the collar 24.

To carry the flap valve 33, a journal is provided in the form of ears 39, 40 having upwardly open slots to receive the pin 41 upon which the flap valve is hung.

The pin 41 is shown as passed through lugs 42 carried by the flap valve and as provided with a cotter pin 43 to retain the pin in position.

To prevent escape of the pin 41 from the slots, there is shown mounted upon the cover 18, a stud 44 provided with an interior shoulder to bear against the inside of the cover and retained in position by a nut 45 upon the exterior of the cover.

To act as a stop for the opening movement of the valve, a stop pin or stud 46 is provided carried by the cover in the same manner as the stud 44. By removal of the plate 18 the studs 44 and 46 will be taken away and the flap valve 33 may be freely lifted from its seat for inspection, repair or replacement.

Flap valve 33 is preferably formed also of a material such as bronze.

To provide a parallel motion of the flap valve relative to the plane of its seat during the initial opening of the valve, the openings in the ears which act as journals for the valve on the pin 41 are elongated as indicated at 48 allowing the valve to move bodily prior to its upward swing and to close by a reverse action.

Figure 3:
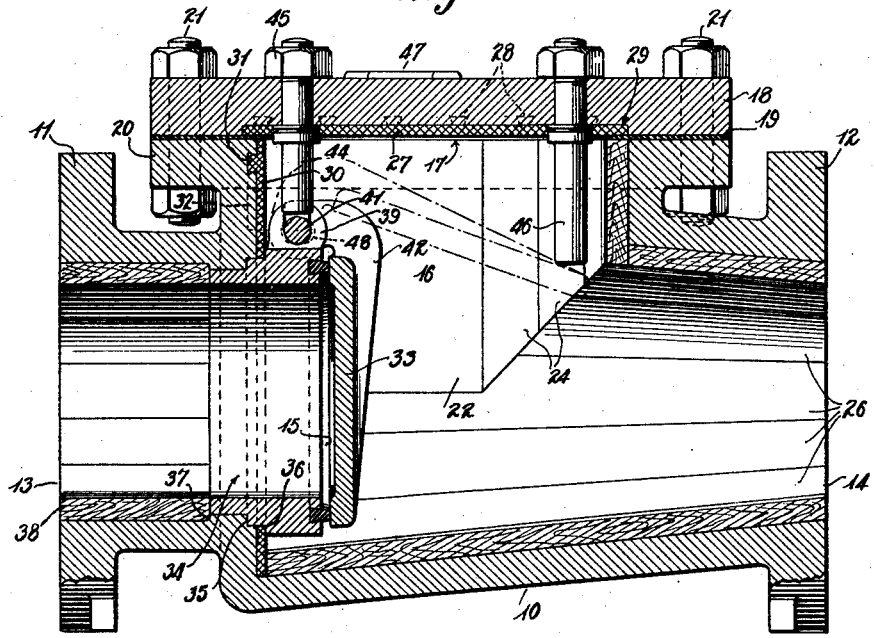
Figure 3 is a central vertical section on line 3—3 of Figure 1.
Figure 4:
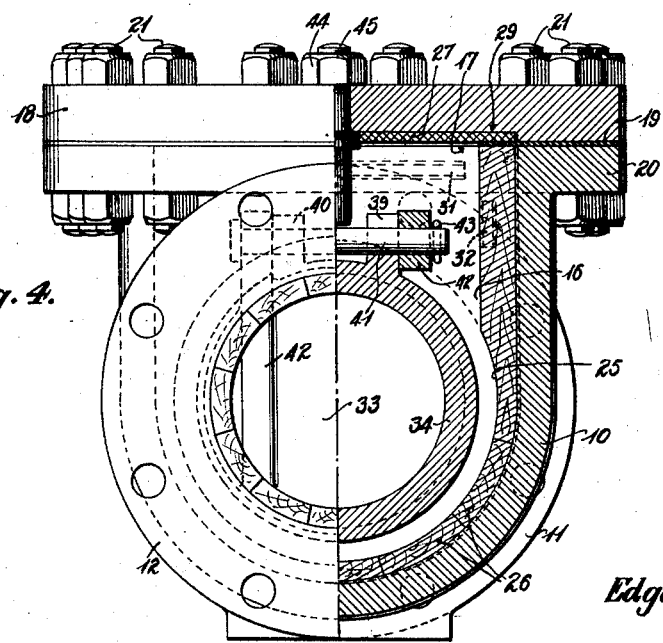
Figure 4 is an end view partly in section on line 4—4 of Figure 1.

The stop pin 46 is made long enough so that when the valve 33 is in its full open position, as shown in dot-and-dash line in Figure 3, the valve will not be completely housed in the recess 22 but the end of the valve will project into the outlet passage. As a result of this relation of parts, the stream of liquid flowing through the valve will exert a constant pressure upon the valve flap and will thus prevent fluttering of the valve. Moreover, since the end of the valve flap is held in the position shown, a backward surge of liquid will immediately exert a closing pressure upon the valve.

A flow direction indicator is desirably provided upon the cover in the form of an arrow 47.

Minor changes may be made in the physical embodiment of the invention without departing from the spirit thereof.

I claim:

1. A check valve comprising, in combination, a casing having axially aligned inlet and outlet ports and an enlargement midway of its length, a collar carrying a valve seat having a shoulder seating against a complementary shoulder upon the interior of the inlet portion of the casing, a lining of non-corroding metal for the base of said enlargement about said collar, a laterally opening recess, a valve coacting with said seat and swinging into said recess, a cover for said opening, a lining of non-corroding metal carried by said cover and a lining of wood within said casing and recess.

2. A check valve comprising, in combination, a casing having a cylindrical inlet portion and a frusto conical outlet portion having a recess adjacent said inlet portion, the base of the outlet portion being larger than the inlet portion, a collar of non-corrodible material seated in the inlet portion and projecting into the outlet portion, a lining of non-corrodible material for said inlet portion abutting said collar and the inner surface thereof substantially flush with the interior surface of said collar, a valve hingedly related to said collar, closing thereagainst and adapted to swing into said recess, and a non-corrodible lining for said outlet portion.

In testimony whereof I affix my signature.

EDGAR IRICK McGEE.